Feb. 7, 1967    W. C. KNOX, JR    3,302,587
AIR SLED FREEWAY
Filed March 12, 1964    3 Sheets-Sheet 1
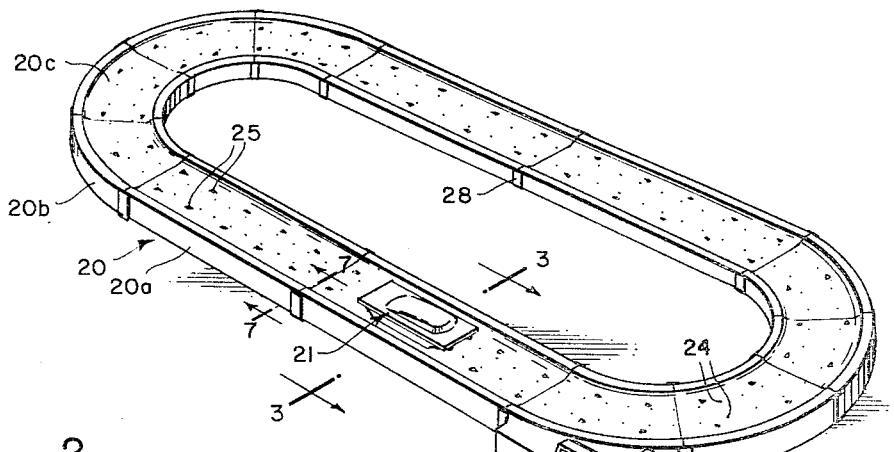
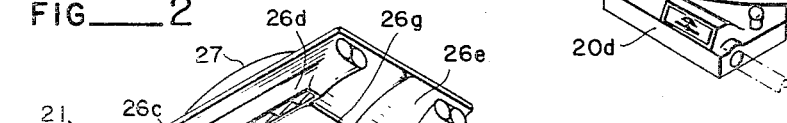
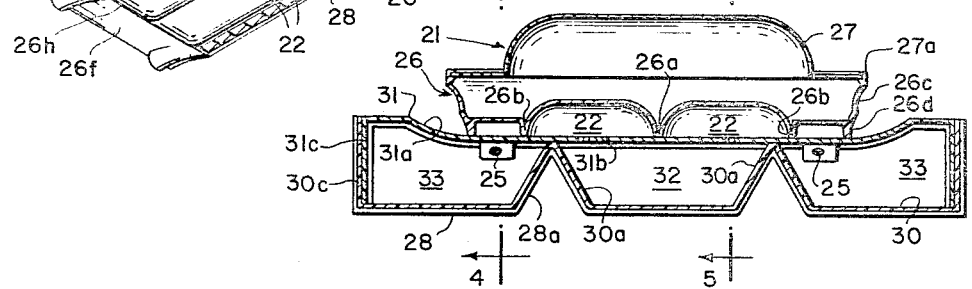
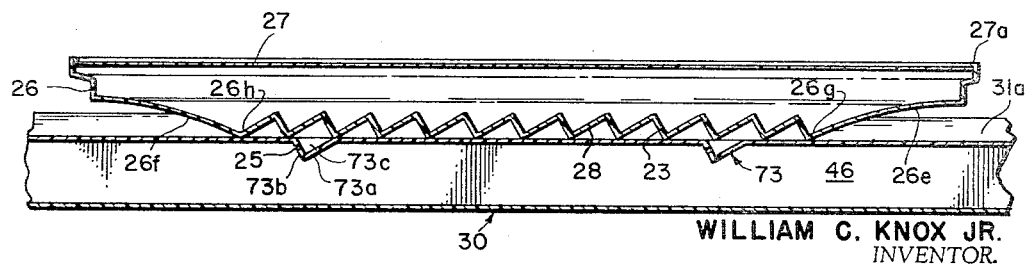
WILLIAM C. KNOX JR.
INVENTOR.
BY *Seed & Berry*
ATTORNEYS Feb. 7, 1967  W. C. KNOX, JR  3,302,587
AIR SLED FREEWAY
Filed March 12, 1964  3 Sheets-Sheet 2
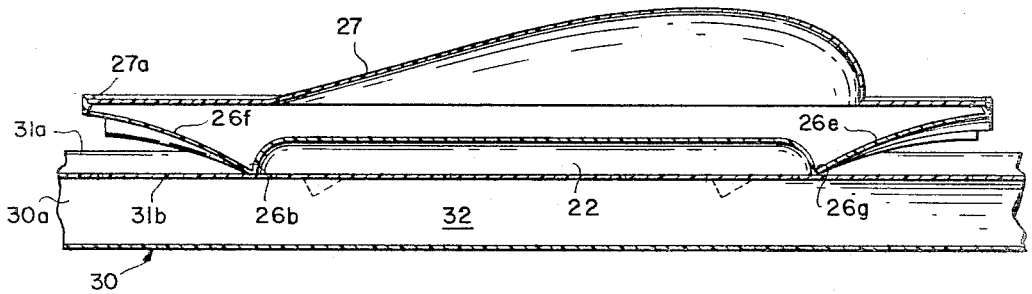
FIG__5
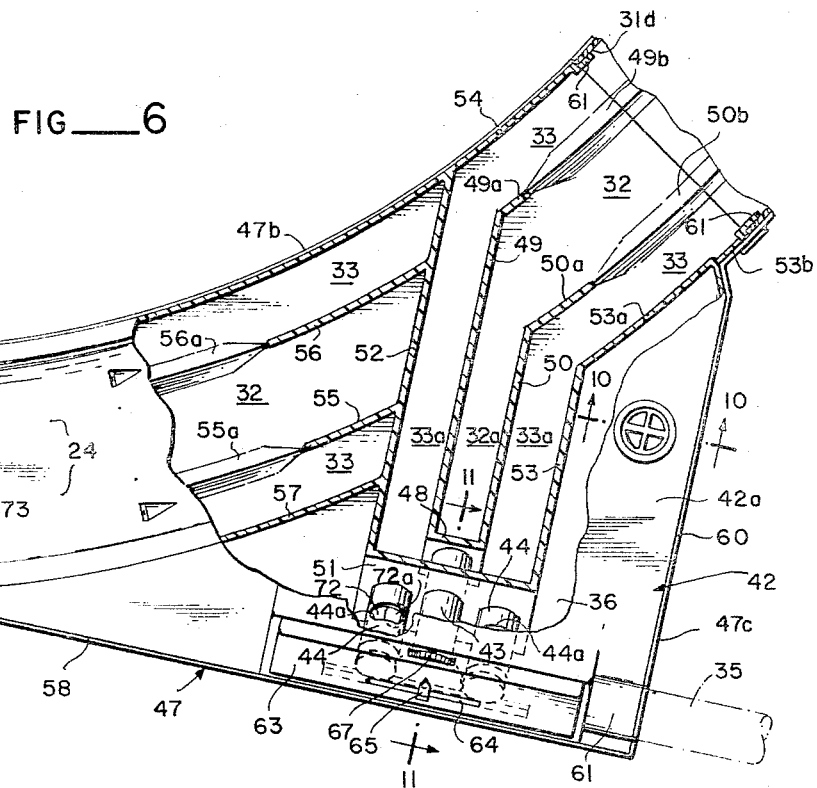
FIG__6
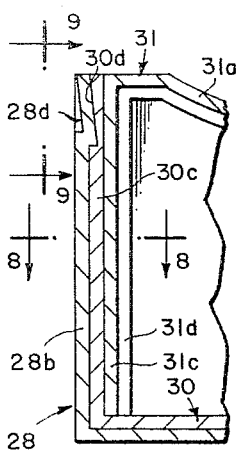
FIG__7
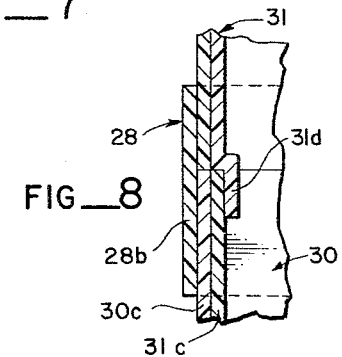
FIG__8
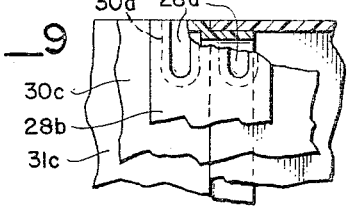
FIG__9
WILLIAM C. KNOX JR.
*INVENTOR.*
BY *Seed & Berry*
*ATTORNEYS*

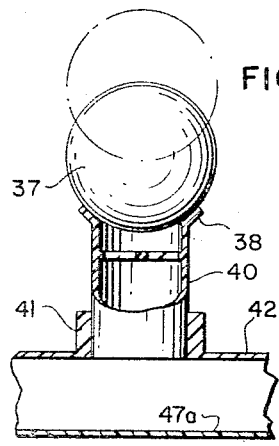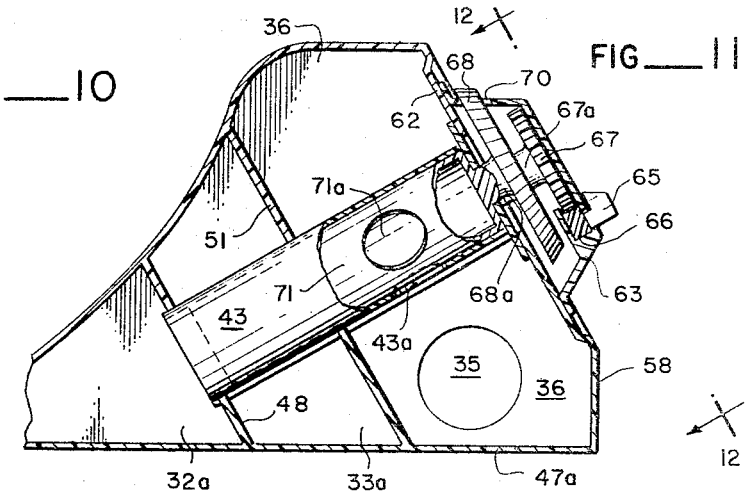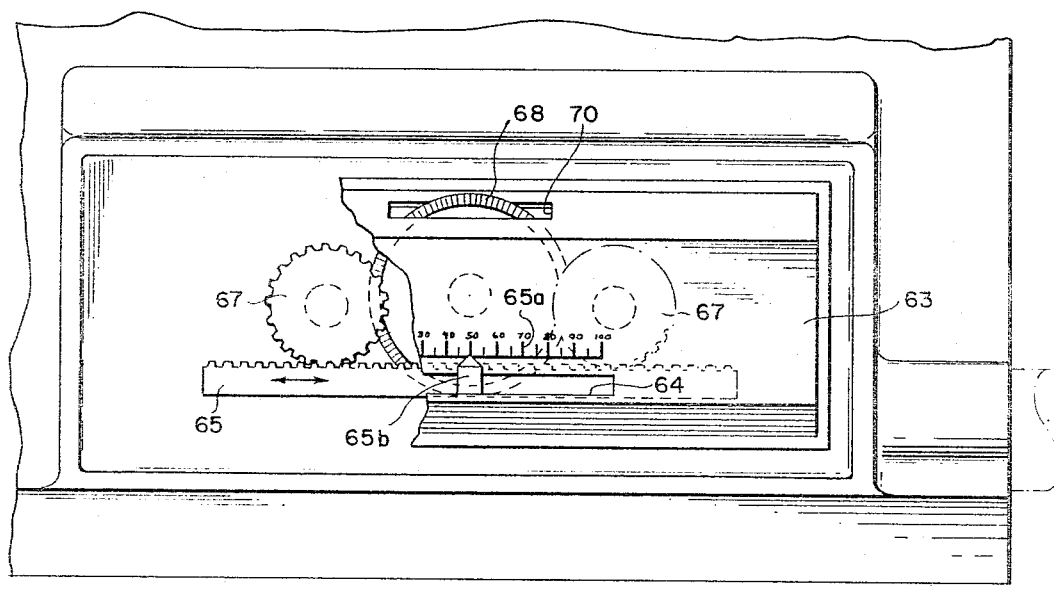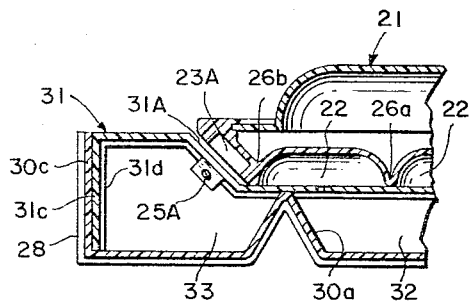

United States Patent Office 3,302,587
Patented Feb. 7, 1967

3,302,587
AIR SLED FREEWAY
William C. Knox, Jr., 504 S. 150th,
Seattle, Wash. 98148
Filed Mar. 12, 1964, Ser. No. 351,420
4 Claims. (Cl. 104—23)

This invention relates to tracked transportation systems of the slide-vehicle type in which the vehicle is propelled above the track on a bearing medium of pressurized fluid. Although having applicability to such systems in which the lubricant between the slide-vehicle and the track is a cushion of water or other liquid supplied continuously above atmospheric pressure, the present invention is more oriented to systems in which air cushion vehicles are utilized. Such vehicles, also often referred to as hovering craft, are borne by a cushion of air having a pressure high enough to float the vehicle above the track surface.

In general, the source of the pressurized lifting fluid for floating slide-vehicles has been carried by the vehicle. Where this has not been true the slide-vehicle was propelled and guided manually or by a ground engaging vehicle, or was propelled without track steering by escapement of pressurized fluid from the fluid cushion through rearwardly directed jets on the vehicle. Controls for such jets had to be on the vehicle and adjustment thereof necessarily affected the fluid cushion.

An important general object of the invention is to provide a transportation system in which the vehicle need not have any working parts. More specifically, the present invention aims to provide a tracked transportation system for air cushion vehicles in which the air cushion is both supplied and controlled remote from the vehicle, and also in which the vehicle propulsion originates and can be controlled remote from the vehicle and independently of the air cushion.

Another important object is to provide an air cushion vehicle transportation system which can be produced relatively inexpensively in miniature as an educational toy and which can be used to give instruction in the principles, operation and design of ground effect machines.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a plan view of the present invention embodied as a toy.

FIG. 2 is a perspective view of the underside of the air-sled vehicle.

FIG. 3 is an enlarged transverse vertical sectional view taken on line 3—3 of FIG. 1.

FIGS. 4 and 5 are fragmentary longitudinal vertical sectional views taken as indicated by lines 4—4 and 5—5 of FIG. 3.

FIG. 6 is a plan view with part of the cover broken away, of the manifold section of the track.

FIG. 7 is a detail transverse vertical sectional view taken on line 7—7 of FIG. 1.

FIG. 8 is a horizontal detail sectional view taken on line 8—8 of FIG. 7.

FIG. 9 is a detail side elevational view with parts broken away taken as indicated by the line 9—9 of FIG. 7.

FIGS. 10 and 11 are detail vertical sectional views taken along the lines 10—10 and 11—11, respectively, of FIG. 6.

FIG. 12 is a fragmentary elevational view looking toward the front of the control panel on the manifold section; and FIG. 13 is a fragmentary transverse vertical sectional view of a modified vehicle and track construction taken the same as FIG. 3.

For purposes of example, the present invention has been illustrated embodied in a toy having an endless hollow track 20 for one or more air-cushion sled-like vehicles 21 of the plenum type. Each vehicle has a pair of side-by-side open plenums 22 and a pair of longitudinal rows of sloped reaction faces 23 on its underside. The plenum chambers 22 are shown as being of the free discharge type commonly used in ground effect machines, but may be of the restricted discharge type, as for example, a plenum having a flexible skirt or having a peripheral air curtain fed from the plenum. In any regard, the air cushion, instead of being fed by fans on the vehicle as in ground effect machines, is supplied with compressed air from a pair of rows of lift jets 24 in the track. Similarly, the track has a pair of rows of propulsion jets 25 to successively impinge the reaction faces 23.

The vehicle 21 may be of two-piece and light-weight molded plastic construction, the plenums 22 and reaction faces 23 being formed in a bottom sled shell 26 which for the purpose of appearance is covered by a cab shell 27. A longitudinal center rib 26a separates the plenums 22 while a pair of longitudinal ribs 26b in turn lie between the outer longitudinal edges of the plenums and the respective rows of reaction faces 23. These faces are directed generally rearward of the vehicle and are joined, top of each to the bottom of the next, by respective deflecting walls 28 to that the reaction faces and deflecting walls collectively have a general saw-tooth like configuration in longitudinal vertical cross-section. The longitudinal side walls 26c of the sled shell depend as skirts at 26d to complement the ribs 26b and are connected front and back by sloped walls 26e and 26f which extend inwardly from the upper rim of the sled shell and form transverse ribs 26g and 26h with the front and back walls of the plenums 22. A tongue-and-groove interfit 27a may be used between the peripheral edge of the cab shell 27 and the upper rib of the sled shell 26 for connecting the shells together.

The track 20 is preferably of knock-down construction for ease of storage, and by way of example, is shown as having an oval path. In such a case the track is composed of straight sections 20a, curved sections 20b and 20c of opposite hand, and a manifold section 20d. These sections all have a telescopic interfit and are held together by clips 28. The track sections 20a, b and c, have been shown as of two-piece construction suitable for production in plastic by a vacuum forming operation, but could be one-piece extrusions, or formed in any other suitable manner, and from metal, wood or paper-board, as well as plastic.

Directing attention to FIG. 3, it is seen that each track section has a lower channel piece 30 with its web formed with a pair of upturned ribs 30a. Nesting within this lower channel is an inverted upper channel piece 31 which has its web centrally dished downwardly at sloped curb wall portions 31a to a central flat track portion 31b. The latter bears against the crown of the ribs 30a to subdivide the interior of the track into a center lift-air passage 32 lying between the ribs, and a pair of outer propulsion-air passages 33—33 positioned between the ribs and the interfitting side flanges 30c and 31c of the pieces 30–31.

As can best be seen in FIGS. 7 and 8 one end of the upper channel piece 31 of each track section is necked at 31d to telescopically interfit with the opposite end of the next section. This interfit provides continuity at the top and sides of the track at the joints between the track sections, while the bottom of the joints is closed by the clips 28 which are channel-shaped and ribbed at 28a (FIG. 3) to overlap the lower track pieces 30. Directing attention to FIGS. 7 and 9, each of the two side flanges 28b of the clips 28 is formed at the top with a pair of locking dimples 28d to seat in matching depressions 30d formed in the side flanges 30c. The side flanges 28b are sufficiently flexible to be sprung apart for application of the clips 28 and seating of their locking dimples, the latter functioning to keep the interfitting track sections from pulling apart at the joints.

Continuing to the manifold section 20d (FIG. 6), the basic function thereof is to supply and regulate the pressures of compressed air to the lift-air and propulsion-air passages 32–33. Like the track sections, the manifold is of two-piece construction comprising a cover 42 fitting within a bottom piece 47. The compressed air supply to the manifold is indicated by tube 35 which may come from any siutable blower source, it being contemplated that in many instances a home vacuum cleaner may serve as the source. In any regard the compressed air charges a manifold chamber 36 which is provided with a lift-ball type of relief valve detailed in FIG. 10. The ball component 37 of this relief valve can be a ping pong ball and may have as its seat the flared upper end of an upright vent tube 40, in turn fitting into a boss 41 provided by the cover 42 of the manifold section.

From the manifold chamber 36 the compressed air is selectively fed through valve sleeves 43 and 44—44 into a lift-air chamber 32a and a pair of propulsion-air chambers 33a—33a. The lift-air chamber is defined by the bottom wall 47a and upper wall 42a of the manifold section, a sloped end wall 48 and side walls 49–50. These side walls parallel one another for a distance and then angle off as curved walls 49a–50a becoming ribs 49b–50b to match the adjoining track section.

The propulsion-air chambers 33a—33a are in turn defined by the bottom wall 47a, upper wall 42a, a sloped front wall 51, the side walls 49–50, and side walls 52–53. The wall 53 angles at 53a in conformance to 50a and at 53b becomes an outer-radius side wall of the cover 42. Similarly, the wall 52 terminates at an inner-radius side wall 54 of the cover. The wall 52 also becomes the terminus of the lift-air and propulsion-air passages of the track. In this regard, curved inner walls 55–56, becoming ribs 55a–56a, and an outer-radius wall 57 extend at cross-angles to the wall 52 together with a continuation of innner-radius wall 54 to match the adjoining track section and thereby continue the lift-air and propulsion-air-passages to the terminal wall 52. In this regard, the bottom piece 47 of the manifold has an upstanding inner-radius flange 47b overlapping the cover wall 54 and an outer continuous upstanding flange 47c overlapping the outer side of the cover 42.

It will be noted that the manifold supply chamber 36 is created by the upper wall 42a, bottom wall 47a, walls 53–53a, front wall 51 of the chambers 33a, the outer portion of wall 52, wall 57, a front wall 58, and an outer side wall 60 adapted with a socket 61 to receive the supply tube 35 through an opening in flange 47c. In order to properly interfit the manifold section with the adjoining track sections, the cover has a necked extension 61 matching the necks 31d.

The upper wall 42a of the manifold is flat through most of its extent, but bulges upwardly in the region of the walls 48 and 51 as indicated in FIG. 11 and has a sloped front wall 62 merging with wall 58. Wall 62 is overlapped by an outwardly dished control panel 63 having a front horizontal slot 64 therethrough for receiving a pointer 65b. This pointer projects as a handle from a slide rack 65 which rides in the groove 66 on the back side of the panel 63 and meshes with a pair of gears 67—67. Turnable between these gears independently thereof is a knurled knob 68 which is accessible for manual adjustment through a slot 70 in the top of the panel 63.

The valves sleeves 44—44 extend from the front wall 62 through the walls 51 and each have a side port 44a for the passage of compressed air from the manifold chamber 36 to the propulsion-air chambers 33a. Similarly, the valve sleeve 43 extends from the front wall 62 through the wall 51 and thence through the wall 48 for air flow through a side port 43a to the lift-air chamber 32a. This air flow is controlled by a tubular rotary valve 71 connected by a stem 68a to the knob 68 having a control port 71a registrable with the sleeve port 43a. The amount of registration between the valve and sleeve ports 71a and 43a as determined by turning of the knob 68 sets the pressure within the lift-air passage 32 of the track. In like manner the sleeves 44 contain tubular rotary valves 72 coupled to the gears 67 by stub shafts 67a and having ports 72a for controlling the flow and hence the pressure, of the air from the manifold chamber 36 to the propulsion-air passages 32. Providing dual valves 72 one for each of the propulsion-air chambers 33a, and interconnecting the latter between the walls 48 and 51 above and beneath the valve sleeve 43, assures like pressures in the propulsion-air passages 32.

In the illustrated manner of construction the cover 42 of the manifold has the walls 49 through 57, 53a, 53b and 62, and the neck 61, formed intgral therewith, while the bottom piece 47 has the flanges 47b and 47c, the walls 49a, 50a, 55 and 56, and the ribs 49b, 50b, 55a, 56a, formed as an integral part thereof. The cover 42 and bottom 47 are then interfitted and bonded together by a suitable adhesive at all contact surfaces. After this, the control panel 63, rack 65, gears 66, knob 68, and related valves are installed. Similarly, the upper and lower pieces 30 and 31 of the track sections are bonded together along their side flanges 30c–31c and along the top edge of the ribs 30a.

As shown in FIG. 12, the control panel 63 is marked with a speed scale 65a above the slot 64 for registration therewith by the pointer 65b. When the pointer is manually advanced to the right up the speed scale, the corresponding movement of the rack 65 turns the gears 66 and their valves 72 counter-clockwise to increase the area of exposure of the valve and sleeve ports and thereby raises the propulsion-air pressure to the two rows of jets 25. These propulsion-air jets, are located in a respective well 73 the mouth of which, as can be seen in FIG. 6, has the shape of an isosceles triangle, the vertex between the equal sides being aimed longitudinally of the track. From this vertex the jet well slopes downwardly to the rear by a deflection wall 73a whose angle of inclination is preferably the same as that of the deflecting walls 28 in the underside of the vehicle. The deflection wall 73a merges at the back of the well at right angles with a sloped nozzle wall 73b, and a pair of triangular side walls 73c complete the pocket. Each nozzle wall 73b is formed with a jet orifice bored therethrough such that the resulting jet 25 is aimed parallel to the underlying deflection wall 73a. By this arrangement the jets 25 are directed at right angles to the reaction faces 23 as the vehicle passes overhead (FIG. 4) and the compressed air jetting from beneath the vehicle is confined to give maximum propulsion effect. The longitudinal spacing between the propulsion-air jets is preferably such that there is always at least one jet in each row acting on the vehicle.

The two rows of lift jets 24 are formed by orifices bored vertically through the central portions 31b of the track sections. Their spacing longitudinally of the track is less than the length of the vehicle plenums 22, and preferably is such that each plenum is continuously exposed to at least two lift-air jets 24 as the vehicle travels over the track.

At the underside of the vehicle the bottom edges of the skirts 26d and the ribs 26a, 26b, 26g and 26h, are coplanar so that the vehicle 21 rests flat against the track when idle, the position shown in the drawings. With the craft in this position, it can be made to hover above the track by turning the knob 68 to charge the lift-air passage 32 via the valve 71 from the manifold chamber. The lift-air jets from the passage 32 through the lift openings 24 and charges the vehicle plenums 22 by the particular lift jets which then happen to be beneath the vehicle. To then set the craft in forward motion, the pointer 65 is advanced to open the valves 72 and thereby charge the propulsion-air passages 33—33. The air jets from the propulsion openings 25 and the air jets then beneath the vehicle impinge against the overlying rows of reaction faces 23. As a result the vehicle is propelled forwardly by the horizontal component of the propulsion-air jets and is also given additional lift by the vertical component thereof. The successive propulsion-air jets 25 maintain the craft in forward motion while the successive lift-air jets 24 sustain the change in the plenums 22 to responsively keep the craft floating above the track as the plenums constantly discharge through the gap vehicle and the track. As the vehicle is propelled around the track the curbs 31a serve a vehicle guide function, particularly at the curves. In this regard, the air escaping from beneath the vehicle tends to provide an air cushion between the craft and the curbs to discourge actual physical contact.

The speed of the vehicle is varied by manually adjusting the setting of the pointer 65b to control the propulsion-air charge to the jets 25. Likewise, the hover height of the vehicle can be independently varied by manual adjustment of the setting of the knob 68.

In FIG. 13 there is shown a modified arrangement in which the two rows of reaction faces 23a have been moved from the bottom of the vehicle to occupy a sloped position along the longitudinal sides thereof in general parallel relation to modified curbs 31a containing the propulsion jets, denoted 25a. The remaining parts in the modified structure have been given the same identifying numerals as the corresponding parts of the vehicle and track hereinbefore described.

It is believed that the invention will have been clearly understood from the foregoing detailed description of my now-preferred illustrated embodiment. Changes in the details of construction may be resorted to without departing from the spirit of the invention and it is my intention that no limitations be implied and that the hereto annexed claims be given the broadest interpretation to which the employed language fairly admits.

I claim:

1. In combination, track means presenting an upper travel surface and having respective longitudinal passages for pressurized lift gas and propulsion gas beneath said surface, a plurality of upwardly directed lift jets spaced along said surface and fed by said pressurized lift gas, a plurality of propulsion jets spaced along said surface and fed by said pressurized propulsion gas, each of said propulsion jets having a jet component in a given travel direction along said surface, control means for varying the lift gas pressure and the propulsion gas perssure independently of one another and a vehicle for said track track adapted to be floated above said path by pressurized fluid from said lift jets and having a plurality of longitudinally spaced reaction surfaces facing generally away from said travel direction and arranged to be successively impinged by the gas from said propulsion jets to propel the vehicle over said travel surface while floating.

2. The combination of claim 1 in which said vehicle has downwardly exposed plenum means for receiving pressurized lift gas and has a row of said reaction surfaces on each longitudinal side of said plenum means, said track having a respective passage for propulsion gas and row of propulsion jets for each said row of reaction surfaces.

3. The combination of claim 1 in which said track means is formed by a plurality of interfitting track sections one of which is a manifold section having a supply of pressurized gas thereto, said control means being in said manifold section.

4. The combination of claim 1 in which curb guide means extends on said travel surface in said travel direction, and in which said propulsion jets are arranged in at least one row generally parallel to said curb guide means.

References Cited by the Examiner

UNITED STATES PATENTS

| | | | |
|---|---|---|---|
| 425,408 | 4/1890 | Craw | 104—23 |
| 3,081,886 | 3/1963 | Flexman et al. | 104—23 |
| 3,140,753 | 7/1964 | Bertin | 180—7 |
| 3,168,875 | 2/1965 | Reed | 104—23 |
| 3,232,366 | 2/1966 | Cockerell | 180—7 |

ARTHUR L. LA POINT, *Primary Examiner.*

R. M. WOHLFARTH, *Assistant Examiner.*